Jan. 17, 1950  P. M. LA HUE  2,495,171
IGNITOR FIRING CIRCUIT
Filed June 1, 1948
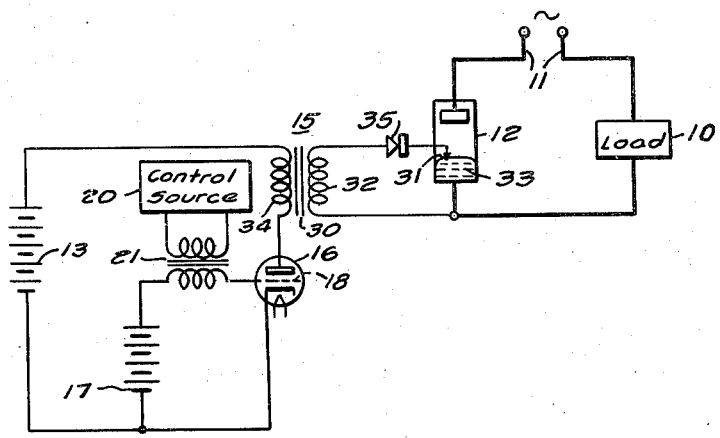
WITNESSES:
E. A. M°Closkey.
New. C. Groome
INVENTOR
Philip M. La Hue.
BY S. A. Stricklett
ATTORNEY Patented Jan. 17, 1950

2,495,171

UNITED STATES PATENT OFFICE 2,495,171

IGNITOR FIRING CIRCUIT

Philip M. La Hue, Denver, Colo., assignor to Westinghouse Electric Corporation, East Pittsburgh, Pa., a corporation of Pennsylvania Application June 1, 1948, Serial No. 30,493

2 Claims. (Cl. 315—272)

My invention relates to a control circuit and, particularly, to a firing circuit for an ignitron-type device.

In the operation of ignitron-type devices, it is desirable to supply ionization energy to the ignitor in the form of impulses of short duration of high energy magnitude. While the total energy required is relatively small, in the conventional type of control apparatus, it was necessary for the control device to pass the peak energy required by the ignitor.

In the more accurate types of firing circuits, the control element is usually an electron tube. Because of the high instant energy passed by the control element, it is customary to use a thyratron type tube, which not only requires a relatively large mounting space, but is expensive and a rather delicate piece of apparatus.

In the system according to my invention, I utilize a system having a relatively small high-vacuum radio-type tube for passing the control energy over a relatively long period of time so that no instant current peak is passed by the control element. The high current peak required for the ignitor element is produced by terminating current flow in the control element of the firing circuit.

It is, accordingly, an object of my invention to provide a control circuit operative at a low energy input over a material interval of time.

It is a further object of my invention to provide a control circuit which utilizes a relatively small high-vacuum type control element.

It is a further object of my invention to provide a control circuit in which the energy input to the make-alive electrode is controlled by cessation of current in the control device.

Other objects and advantages of my invention will be apparent from the following detailed description, taken in conjunction with the accompanying drawing, in which the figure is a schematic illustration of a vapor-electric device embodying my invention.

In the illustrated embodiment of my invention, load current is supplied to a direct-current load device 10 from an alternating-current system 11 by means of a vapor-electric valve 12 of the ignitron type, the operation of the valve 12 being regulated by my improved control circuit in which control energy is supplied from a suitable direct-current source herein illustrated as a storage battery 13. The control elements comprise an iron-cored reactor 15 and a high-vacuum grid-controlled tube 16 connected in series across the direct-current source 13 to be energized therefrom. Current flow from the direct-current source 13 through the charging circuit is controlled by energization of the grid 18 of the high-vacuum tube 16. Normally, a direct-current bias 17 is applied to the grid 18 of sufficient magnitude to prevent current flow through the high-vacuum tube 16 and a periodic source 20 is coupled by transformer 21 to the grid 18 for applying potential to render the grid 18 sufficiently positive to allow current to flow in the high-vacuum device 16.

As current flows in the high-vacuum device 16, the amount of current flowing in the series circuit will build up from a very low value to the maximum permitted by the high-vacuum valve 16 at which time the periodic impulse is cut off and the high-vacuum tube 16 ceases to carry current because of the normal locking bias 17 applied to the grid 18.

The flow of current through the iron-cored reactor 15 has stored energy in the core 30 and this energy is now utilized for supplying a current impulse to the ignitor electrode 31. I provide a second winding 32 coupled with the iron core 30 and connected to the ignitor electrode 31 and the cathode 33 of the ignitron device 12. On the cessation of current flow in the control valve 12, a high-current high-energy surge is produced in the winding 32 associated with the iron core 30; and, since current cannot flow in the primary winding 34, current flows in the secondary winding 32 through the make-alive electrode 31 to initiate the cathode spot in the ignitron device 12.

To prevent an excessive amount of energy from being dissipated in the discharge circuit during the charging interval of the iron-cored reactor 15, I prefer to provide a unidirectional conductor 35 in the discharge circuit so that substantially all of the energy controlled by the high-vacuum tube 16 may be stored in the iron-cored reactor 15, and dissipated as a surge to initiate the cathode spot in the vapor-electric valve 12.

In the operation of my control system, the normal blocking potential 17 applied to the grid 18 of the tube 16 prevents energization of the ignitor circuit except in response to a triggering system 20 which may be either periodical, intermittent or of any other desired type. For normal operations, a periodic impulse will apply sufficient potential to the control grid 18 to remove the blocking potential 17 and allow current flow for a predetermined time interval. Cessation of the control impulse likewise produces cessation of current flow in the control high-vacuum tube 16 and produces the high-current high-voltage impulse necessary for initiating the cathode spot.

While any suitable high-vacuum tube may be utilized, I prefer to provide a tube 16 which will permit a forward current of approximately two amperes maximum associated with a reactor 15 having an inductance of approximately one-tenth henries. This will give a stored energy of approximately .2 watt-second which has been found sufficient to reliably fire an ignitor when the impulse is of sufficiently short duration. I have found it desirable to supply a direct-current potential of approximately 1000 volts and to provide a reactor having a twenty-to-one turn ratio so that the ignitor circuit will have a peak amperage of the order of forty amperes.

For the purpose of illustration, I have shown a specific embodiment of my invention, and described my invention to the best of my present understanding, and it is apparent that changes and modifications can be made therein without departing from the true spirit of my invention or the scope of the appended claims.

I claim as my invention:

1. A control system for a vapor-electric valve having an ignitor electrode comprising a source of electric current, an impulsing circuit connected to be energized from said source, said circuit including an iron-cored reactor and a grid-controlled high-vacuum electron valve connected in series with said source, connections for applying a biasing potential to the grid of said valve means for periodically applying an impulse to said grid to release the valve for a predetermined interval, a second winding associated with said iron core and connections including a unidirectional conductor applying the potential of said second winding to said ignitor electrode.

2. A control circuit for supplying periodic impulses to a control electrode of an electric valve comprising a source of electric current, a reactor connected in an energy-receiving relation to said source, a high-vacuum valve connected to control current flow to said reactor from said source, a second winding associated with said reactor, a unidirectional current-carrying circuit connecting said second winding to the control electrode.

PHILIP M. LA HUE.

REFERENCES CITED

The following references are of record in the file of this patent:

UNITED STATES PATENTS

| Number | Name | Date |
|---|---|---|
| 2,057,585 | Palmer | Oct. 13, 1936 |
| 2,411,358 | Bichsel | Nov. 19, 1946 |